United States Patent
Fujita et al.

(10) Patent No.: US 8,767,028 B2
(45) Date of Patent: Jul. 1, 2014

(54) IMAGE FORMING APPARATUS

(75) Inventors: Daisuke Fujita, Toyokawa (JP); Shinpei Arino, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 274 days.

(21) Appl. No.: 13/231,235

(22) Filed: Sep. 13, 2011

(65) Prior Publication Data

US 2012/0062683 A1  Mar. 15, 2012

(30) Foreign Application Priority Data

Sep. 15, 2010  (JP) ................. 2010-206772

(51) Int. Cl.
*B41J 2/47* (2006.01)
*B41J 2/435* (2006.01)

(52) U.S. Cl.
USPC ........... 347/234; 347/235; 347/236; 347/246; 347/250

(58) Field of Classification Search
USPC .......................... 347/234, 235, 236, 246, 250
See application file for complete search history.

(56) References Cited

U.S. PATENT DOCUMENTS

| | | | |
|---|---|---|---|
| 4,933,549 A * | 6/1990 | Fujioka et al. | 250/235 |
| 5,278,587 A | 1/1994 | Strauch et al. | |
| 5,444,234 A * | 8/1995 | Hennerici et al. | 250/206.2 |
| 6,163,333 A * | 12/2000 | Kamioka | 347/241 |
| 6,166,376 A * | 12/2000 | Kamioka | 250/235 |
| 6,426,767 B1 | 7/2002 | Tanimoto et al. | |
| 7,098,448 B2 | 8/2006 | Inoue et al. | |
| 7,626,722 B2 | 12/2009 | Niito | |
| 7,643,046 B2 | 1/2010 | Imai et al. | |
| 7,903,134 B2 | 3/2011 | Itabashi et al. | |
| 8,072,667 B2 * | 12/2011 | Suzuki et al. | 359/205.1 |
| 8,274,538 B2 * | 9/2012 | Okada | 347/236 |
| 2009/0231656 A1 | 9/2009 | Suzuki et al. | |
| 2009/0251755 A1 | 10/2009 | Oda | |

FOREIGN PATENT DOCUMENTS

| | | |
|---|---|---|
| CN | 1464349 A | 12/2003 |
| CN | 101551614 A | 10/2009 |
| JP | 6-143687 A | 5/1994 |
| JP | 2002-273942 A | 9/2002 |
| JP | 2003-254862 A | 9/2003 |
| JP | 2004-020959 A | 1/2004 |
| JP | 2004-286508 A | 10/2004 |

(Continued)

OTHER PUBLICATIONS

Office Action (Notification of Reasons for Refusal) dated Jul. 31, 2012, issued in corresponding Japanese Patent Application No. 2010-206772, and an English Translation thereof. (7 pages).

(Continued)

*Primary Examiner* — Alessandro Amari
*Assistant Examiner* — Jeremy Bishop
(74) *Attorney, Agent, or Firm* — Buchanan Ingersoll & Rooney PC

(57) ABSTRACT

An image forming apparatus having: a light source for emitting a beam; a deflector for deflecting the beam; a light receiving element for receiving the beam and generating a detection signal; a converter for converting electric potentials of the detection signal into data values and generating time data associated with the data values; and a first calculator for calculating a position of center of the beam from the data values and the time data.

13 Claims, 8 Drawing Sheets

(56) References Cited

FOREIGN PATENT DOCUMENTS

| | | | | |
|---|---|---|---|---|
| JP | 2004286508 A | * | 10/2004 | ............ G01B 11/00 |
| JP | 2005-055280 A | | 3/2005 | |
| JP | 2005-181019 A | | 7/2005 | |
| JP | 2005-257495 A | | 9/2005 | |
| JP | 2006-220885 A | | 8/2006 | |
| JP | 2008-076556 A | | 4/2008 | |
| JP | 2008-265127 A | | 11/2008 | |
| JP | 2009-180753 A | | 8/2009 | |
| JP | 2009-244843 A | | 10/2009 | |

OTHER PUBLICATIONS

Office Action (Notification of First Examination Result) dated Sep. 14, 2013 issued in corresponding Chinese Patent Application No. 201110270656.1 and an English Translation thereof (17 pages).

* cited by examiner

F I G. 2
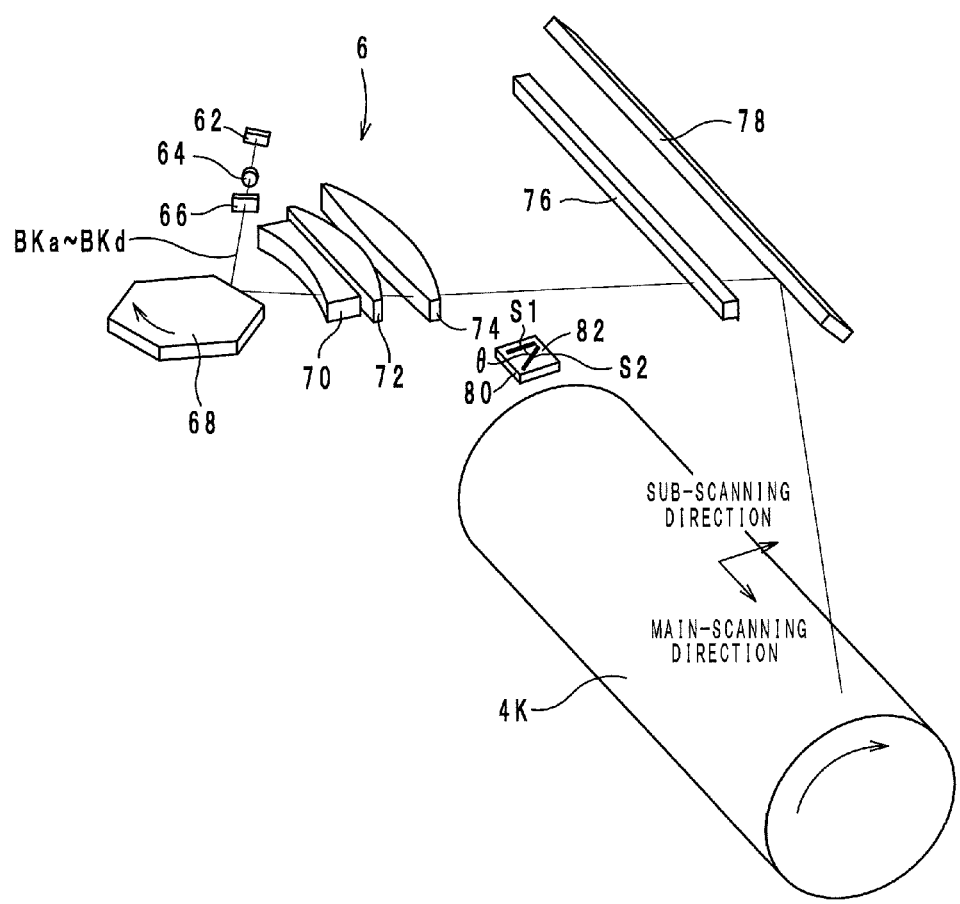

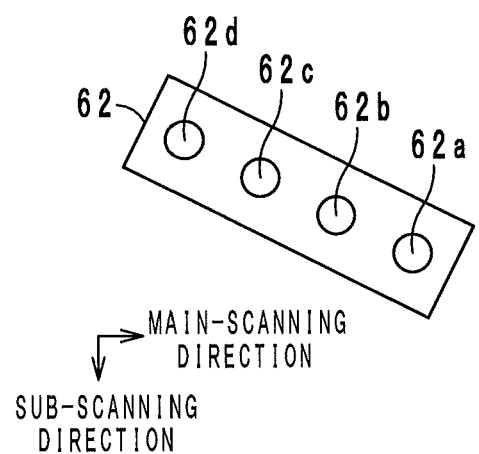
F I G. 3a
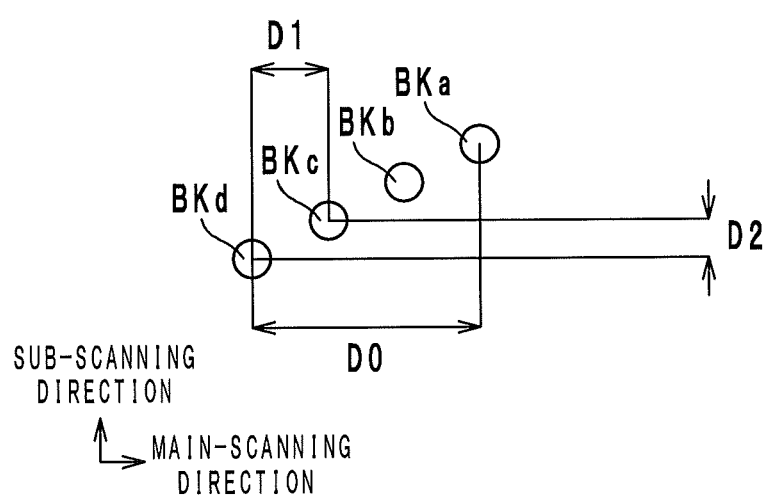
F I G. 3b

F I G. 6
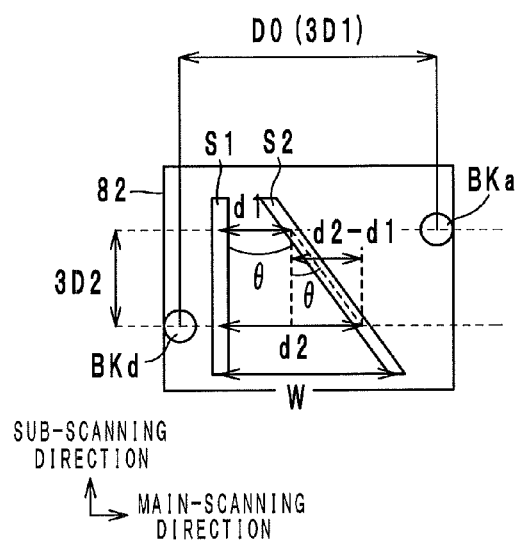
SUB-SCANNING
DIRECTION
↑
→ MAIN-SCANNING
DIRECTION
F I G. 7
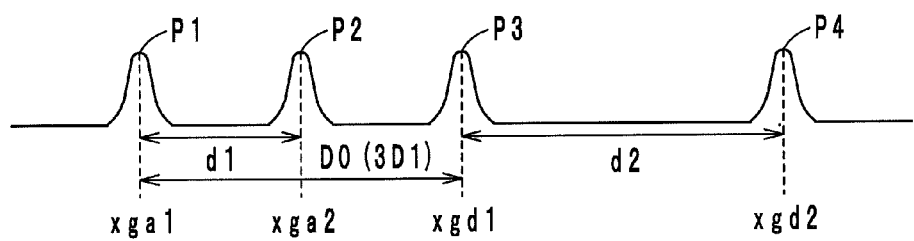

F I G. 1 1 a
PD OUTPUT
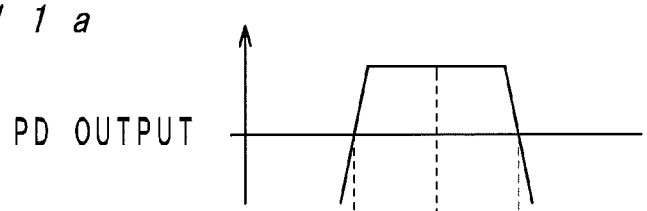
F I G. 1 1 b
COMP OUTPUT
F I G. 1 1 c
DELAY OUTPUT
F I G. 1 1 d
LIGHT INTENSITY
MONITOR SIGNAL
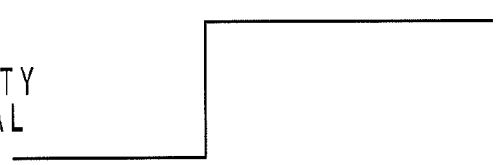

US 8,767,028 B2

IMAGE FORMING APPARATUS

This application is based on Japanese patent application No. 2010-206772 filed on Sep. 15, 2010, the content of which is incorporated herein by reference.

BACKGROUND OF THE INVENTION

1. Field of the Invention

The present invention relates to an image forming apparatus, and more particularly to an image forming apparatus that emits light from a light source, that deflects the light with a deflector and that scans a photoreceptor with the light.

2. Description of Related Art

An example of conventional image forming apparatuses is a color image forming apparatus disclosed by Japanese Patent Laid-Open Publication No. 2009-244843. In the color image forming apparatus, the light intensity of a laser beam is adjusted in the way described below. FIGS. 11a to 11d are signal waveform diagrams used for the light intensity adjustment to the laser beam in the color image forming apparatus. FIG. 11a shows an output waveform from a PD (photodiode), and FIG. 11b is an output waveform from a COMP circuit. FIG. 11c shows an output waveform from a delay circuit, and FIG. 11d shows a waveform of a light intensity monitor signal.

When the PD receives light, the PD generates a PD output as shown by FIG. 11a. The COMP circuit generates a COMP output as shown by FIG. 11b, and the COMP output is on a high level while the PD output is over a threshold value. The delay circuit generates a delay output that rises to a high level with a delay of a specified time from the rise of the COMP output. The rise of the delay output incidents with the peak (the center of the high-level period) of the PD output. As shown by FIG. 11d, the light intensity monitor signal is generated based on the delay signal. The light intensity monitor signal is used for the light intensity adjustment to the laser beam.

In the color image forming apparatus disclosed by Japanese Patent Laid-Open Publication No. 2009-244843, however, the rise of the delay output may not be incident with the peak (the center of the high-level period) of the PD output. More specifically, the high-level potential of the PD output fluctuates. When the high-level potential of the PD output is relatively low, the PD output rises gradually, and when the high-level potential is relatively high, the PD output rises steeply. Accordingly, the time when the PD output comes over the threshold value depends on the value of the high-level potential of the PD output. The delay time from the COMP output is fixed although the high-level potential of the PD output fluctuates. Therefore, the rise of the delay output may not be incident with the peak (the center of the high-level period) of the PD output.

SUMMARY OF THE INVENTION

An object of the present invention is to provide an image forming apparatus that detects the position of center of a beam accurately.

An image forming apparatus according to an embodiment of the present invention comprises: a light source for emitting a beam; a deflector for deflecting the beam; a light receiving element for receiving the beam and generating a detection signal; a converter for converting electric potentials of the detection signal into data values and generating time data associated with the data values; and a first calculator for calculating a position of center of the beam from the data values and the time data.

BRIEF DESCRIPTION OF THE DRAWINGS

This and other objects and features of the present invention will be apparent from the following description with reference to the accompanying drawings, in which:

FIG. 2 is a perspective view of an optical scanning device;

FIGS. 3a and 3b show beams, FIG. 3a being a plan view of a light source viewed from a beam traveling direction, and FIG. 3b showing beams on a photosensitive drum;

FIG. 6 is an illustration showing the state wherein the beams are passing across slits;

FIG. 7 is a diagram showing the waveform of a detection signal that is outputted from a photodiode while the beams are passing across the slits;

FIGS. 11a to 11d are waveform charts used for and adjustment to laser beam intensity in a color image forming apparatus disclosed by Japanese Patent Laid-Open Publication No. 2009-244843.

DETAILED DESCRIPTION OF THE PREFERRED EMBODIMENTS

Structure of the Image Forming Apparatus

Figure 1:
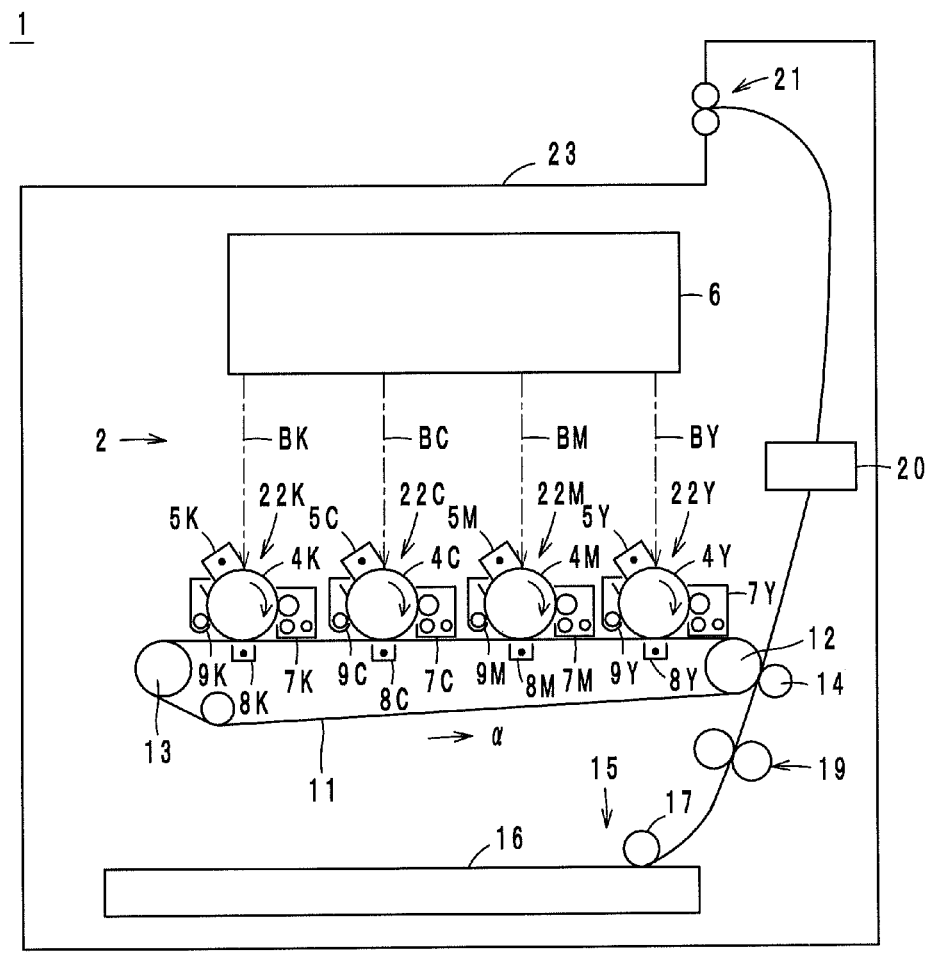
FIG. 1 is a skeleton framework of an image forming apparatus.

An image forming apparatus 1 according to an embodiment of the present invention will be hereinafter described with reference to the accompanying drawings. FIG. 1 shows the general structure of the image forming apparatus 1.

The image forming apparatus 1 is an electrophotographic color printer of a tandem type that combines images of four colors, that is, Y (yellow), M (magenta), C (cyan) and K (black). The image forming apparatus 1 forms an image on a paper sheet P in accordance with image data read by a scanner, and comprises a printing section 2, a feeding section 15, a pair of timing rollers 19, a fixing device 20, a pair of ejection rollers 21 and a printed-sheet tray 23.

The feeding section 15 feeds paper sheets P one by one, and comprises a sheet tray 16 and a feed roller 17. On the sheet tray 16, paper sheets P to be subjected to printing are stacked. The feed roller 17 picks one sheet from the stack of paper sheets P on the sheet tray 16.

The pair of timing rollers 19 feeds a paper sheet P fed by the feed roller 17 forward in good timing so that a toner image can be transferred onto the paper sheet P in the printing section 2.

The printing section 2 forms a toner image on a paper sheet P fed from the feeding section 15. The printing section 2 comprises an optical scanning device 6, transfer devices 8 (8Y, 8M, 8C and 8K), a transfer belt 11, a driving roller 12, a driven roller 13, a secondary transfer roller 14, and image forming units 22 (22Y, 22M, 22C and 22K). The image forming units 22 (22Y, 22M, 22C and 22K) comprise photosensitive drums 4 (4Y, 4M, 4C and 4K), chargers 5 (5Y, 5M, 5C and 5K), developing devices 7 (7Y, 7M, 7C and 7K), and cleaners 9 (9Y, 9M, 9C and 9K), respectively.

The photosensitive drums 4 (4Y, 4M, 4C and 4K) are cylindrical and are driven to rotate clockwise in FIG. 1. The chargers 5 (5Y, 5M, 5C and 5K) charge the peripheral surfaces of the photosensitive drums 4 (4Y, 4M, 4C and 4K). The optical scanning device 6 scans the peripheral surfaces of the photosensitive drums 4 (4Y, 4M, 4C and 4K) with beams B (BY, BM, BC and BK), controlled by a control section (not shown). A detailed description of the optical scanning device 6 will be given later. By the operation of these elements, electrostatic latent images are formed on the peripheral surfaces of the photosensitive drums 4 (4Y, 4M, 4C and 4K).

The developing devices 7 (7Y, 7M, 7C and 7K) develop the electrostatic latent images on the photosensitive drums 4 (4Y, 4M, 4C and 4K) into toner images.

The transfer belt 11 is stretched between the driving roller 12 and the driven roller 13. The transfer devices 8 are disposed to face to the inner peripheral surfaces of the transfer belt 11, and transfer the toner images from the photosensitive drums 4 to the transfer belt 11 (primary transfer). In this moment, the toner images of the four colors are combined and turned into a composite full-color image. The cleaners 9 remove residual toner remained on the photosensitive drums 4 after the primary transfer. The driving roller 12 is rotated by an intermediate transfer belt driving section (not shown in FIG. 1), and thereby, the transfer belt 11 is moved in a direction of arrow a. Accordingly, the transfer belt 11 carries the full-color toner image to the secondary transfer roller 14.

The secondary transfer roller 14, which is cylindrical, faces to the transfer belt 11. A transfer voltage is applied to the secondary transfer roller 14, and thereby, the full-color toner image is transferred from the transfer belt 11 to a paper sheet P passing through between the transfer belt 11 and the secondary transfer roller 14 (secondary transfer).

The paper sheet P with a toner image transferred thereon is fed to the fixing device 20. The fixing device 20 performs a heating treatment and a pressing treatment toward the paper sheet P so as to fix the toner image on the paper sheet P. The pair of ejection rollers 21 feeds the paper sheet P fed from the fixing device 20 onto the printed-sheet tray 23. Thus, paper sheets that have, been subjected to printing are stacked on the printed-sheet tray 23.

Structure of the Optical Scanning Device

The structure of the optical scanning device 6 is hereinafter described with reference to the drawings. FIG. 2 is a perspective view of the optical scanning device 6. FIG. 2 shows only the structure that permits the photosensitive drum 4K to be scanned with the beam BK.

The optical scanning device 6 comprises a light source 62, a collimator lens 64, a cylindrical lens 66, a deflector 68, scanning lenses 70, 72, 74 and 76, and a diverting mirror 78. The image forming apparatus 1 further comprises a photodiode 80 and a cover 82. The light source 62 emits a plurality of beams (four beams) BKa, BKb, BKc and BKd concurrently. In FIG. 2, the beams BKa, BKb, BKc and BKd are collectively shown as a beam BK.

The collimator lens 64 shapes each of the beams BKa to BKd emitted from the light source 62 into a substantially parallel light. The cylindrical lens 66 causes the beams BKa to BKd to converge linearly on reflecting surfaces of the deflector 68.

The deflector 68, which comprises a polygon mirror and a motor (not shown) for rotating the polygon mirror, deflects the beams BKa to BKd. The scanning lenses 70, 72, 74 and 76 focus the beams BKa to BKd on the peripheral surface of the photosensitive drum 4K. The diverting mirror 78 reflects the beams BKa to BKd that passed through the scanning lens 76 to the photosensitive drum 4K.

The photosensitive drum 4K, which is cylindrical, is charged by the charger 5K (see FIG. 1). The photosensitive drum 4K is scanned with the beams BKa to BKd in a main-scanning direction repeatedly, and thereby, an electrostatic latent image is formed on the peripheral surface of the photosensitive drum 4K.

The photodiode (light receiving element) 80 receives the beams BKa to BKd and generates detection signals having electric potentials in accordance with the intensities of the beams BKa to BKd. As shown in FIG. 2, the photodiode 80 is located near the photosensitive drum 4K, upstream from the photosensitive drum 4K in the main-scanning direction. The photodiode 80 is, for example, a PIN photodiode.

The cover 82 is a plate-like component covering a light receiving surface of the photodiode 80. Slits S1 and S2 are made in the cover 82. The slit S1 is a linear hole extending in a direction perpendicular to the main-scanning direction, that is, in a sub-scanning direction. The slit S2 is a linear hole extending in a direction not parallel to the slit S1. In this embodiment, the slit S2 is formed such that the more upstream in the sub-scanning direction, the larger the distance between the slit S1 and the slit S2, and the slit S1 and the slit S2 are at an angle of θ (for example, 45 degrees). The widths of the slits S1 and S2 are smaller than the diameters of the spots of the beams BKa to BKd on the cover 82. For example, the diameters of the beam spots BKa to BKd on the cover 82 are 70 μm, and the widths of the slits S1 and S2 are 10 μm. For the cover 82, for example, SUS304 with a thickness of 0.010 mm may be used, and the slits S1 and S2 may be formed by electric spark machining. The parts of the cover 82 other than the slits S1 and S2 have a transmittance of 1% or less.

Next, the light source 62 is described in detail with reference to the drawings. FIG. 3a is a plan view of the light source 62 viewed from a traveling direction of the beams BKa to BKd. FIG. 3b is a plan view showing the beams BKa to BKd on the photosensitive drum 4K.

The light source 62 is, for example, a laser diode having light emitting points 62a to 62d that emit the beams BKa to BKd respectively as shown by FIG. 3a. The light emitting points 62a to 62d are aligned at regular intervals in a direction not parallel to the main-scanning direction. If the light emitting points 62a to 62d are aligned in the main-scanning direction, the beams BKa to BKd will overlap one another.

As shown by FIG. 3b, the beams BKa to BKd on the photosensitive drum 4K and on the cover 82 are aligned at regular intervals in a direction not parallel to the main-scanning direction. In other words, the beams BKa to BKd are aligned at regular intervals in the main-scanning direction from the positive side to the negative side in this order and aligned at regular intervals in the sub-scanning direction from the positive side to the negative side in this order. In the following paragraphs, the pitch of the beams BKa to BKd in the main-scanning direction is denoted by D1, and the pitch of the beams BKa to BKd in the sub-scanning direction is denoted by D2.

The distance in the main-scanning direction between the beams BKa and BKd that are located at both ends is denoted by D0. The distance in the main-scanning direction D0 between the beams BKa and BKd is larger than the maximum distance in the main-scanning direction between the slits S1 and S2. For example, when the beam BK is composed of eight beams, the distance D0 is 1800 μm, and the maximum distance in the main-scanning direction between the slits S1 and S2 is 1500 μm.

The light source 62 of the structure above is driven by a motor to rotate on the optical axis. Thereby, the distance D0 and the pitches D1 and D2 can be adjusted.

Block Configuration

Figure 4:
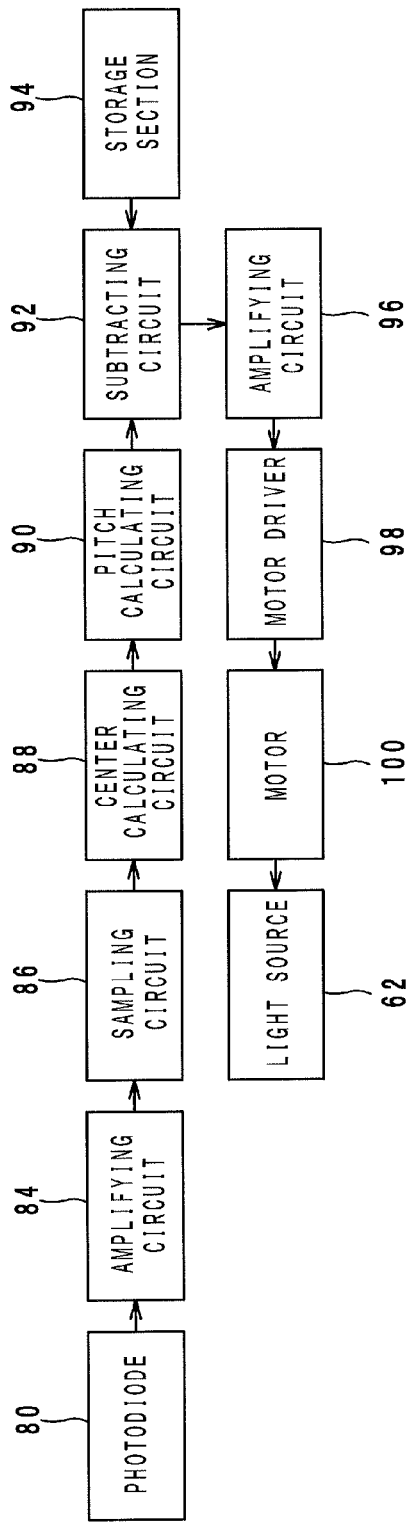
FIG. 4 is a block diagram of the image forming apparatus.
Figure 5:
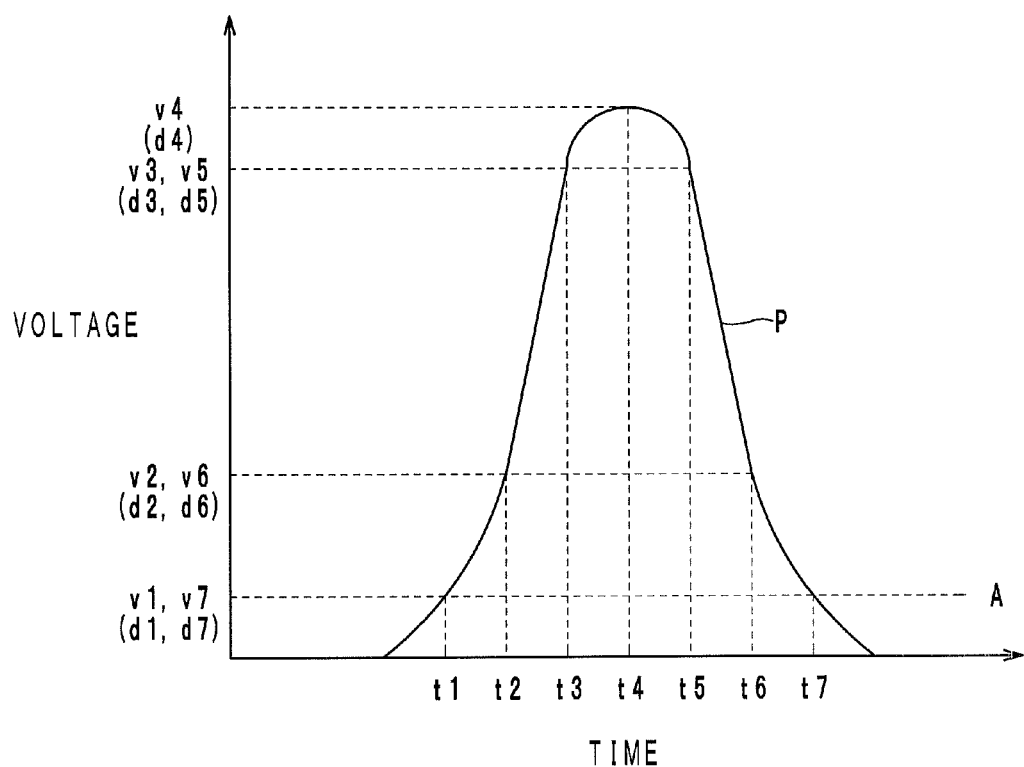
FIG. 5 is a graph showing the waveform of a detection signal.

In the image forming apparatus 1, based on the detection signal outputted from the photodiode 80, the pitch of the beams BKa to BKd in the main-scanning direction D1 and the pitch of the beams BKa to BKd in the sub-scanning direction D2 are adjusted. A block configuration for the adjustments is hereinafter described with reference to the drawings. FIG. 4 is a block diagram of the image forming apparatus 1. FIG. 5 shows a waveform of the detection signal.

As shown by FIG. 4, the image forming apparatus 1 further comprises an amplifying circuit 84, a sampling circuit 86, a center calculating circuit 88, a pitch calculating circuit 90, a subtracting circuit 92, a storage section 94, an amplifying circuit 96, a motor driver 98 and a motor 100.

The photodiode 80 receives the beams BKa and BKd and outputs a detection signal with electric potentials varying in accordance with the intensities of the beams BKa and BKd. For example, when the beam BKa passes transversely across the slit S1, a detection signal with a pulse P as shown by FIG. 5 is generated. The detection signal shown by FIG. 5 is a signal amplified by the amplifying circuit 84 that will be described later, and the detection signal outputted from the photodiode 80 has lower electric potentials.

The amplifying circuit 84 amplifies the detection signal, and thereby, the detection signal shown by FIG. 5 can be obtained. The sampling circuit 86 converts the electric potentials of the analog detection signal into digital data values dn (n=integer) at regular time intervals. Next, operation of the sampling circuit 86 is described.

The sampling circuit 86 starts generating the data values dn when the electric potential of the detection signal goes beyond a threshold A as shown in FIG. 5. More specifically, the electric potential of the detection signal goes beyond the threshold A at time t1, and the electric potential at time t1 is v1. The sampling circuit 86 converts the electric potential v1 into a data value d1, and thus, the data value d1 and data about the time t1 (time data t1) associated with the data value d1 are generated and sent to the center calculating circuit 88. Thereafter, the sampling circuit 86 converts the electric potentials v2 to v7 into data values d2 to d7, and the data values d2 to d7 and time data t2 to t7 associated with the data values d2 to d7 are generated and sent to the center calculating circuit 88. After the time t7, because the electric potential of the detection signal is below the threshold A, the sampling circuit 86 does not perform the conversion from the detection signal into data values.

The center calculating circuit 88 calculates the position of the center xga1 of the beam BKa passing across the slit S1, from the data values d1 to d7 and the time data t1 to t7. More specifically, the center calculating circuit 88 takes cognizance of the traveling speed v in the main-scanning direction of the beam BKa, and calculates the position of the center xga1 of the beam BKa passing across the slit S1 by using the following expression (1). In this embodiment, n is 7.

$$xga1 = \frac{\sum_{i=1}^{n}(di \cdot xi)}{\sum_{i=1}^{n} di} \cdot v \qquad (1)$$

With the operation above, the image forming apparatus 1 can obtain the position of the center xga1 of the beam BKa passing across the slit S1. In the same manner, the image forming apparatus 1 can obtain the position of the center xga2 of the beam BKa passing across the slit S2.

Thereafter, when scanning with the beam BKd starts, the beam BKd passes transversely across the slits S1 and S2. In this moment, the image forming apparatus 1 obtains the position of the center xgd1 of the beam BKd passing across the slit S1 and the position of the center xgd2 of the beam BKd passing across the slit S2 in the same manner as described above.

The pitch calculating circuit 90 calculates the pitch of the beams BKa to BKd in the main-scanning direction D1 and the pitch of the beams BKa to BKd in the sub-scanning direction D2. The calculations of the pitches D1 and D2 are hereinafter described with reference to the drawings. FIG. 6 shows travels of the beams BKa and BKd across the slits S1 and S2. FIG. 7 shows the waveform of the detection signal outputted from the photodiode 80 when the beams BKa and BKd pass across the slits S1 and S2. In FIG. 7, the vertical axis shows electric potential, and the horizontal axis shows time (position).

In the image forming apparatus 1, as shown by FIG. 6, the distance in the main-scanning direction D0 between the beams BKa and BKd is larger than the maximum distance in the main-scanning direction W between the slits S1 and S2. Therefore, after the beam BKa finishes passing across the slits S1 and S2, the beam BKd starts passing across the slits S1 and S2. Accordingly, the detection signal has a waveform composed of four serial pulses P1 to P4 as shown by FIG. 7. The pulses P1 and P2 occur in the detection signal when the beam BKa passes across the slits S1 and S2 respectively, and the pulses P3 and P4 occur in the detection signal when the beam BKd passes across the slits S1 and S2 respectively.

In FIG. 7, the vertical axis shows electric potential, and the horizontal axis shows time. The detection signal shown in FIG. 7 can be considered to represent the beams BKa and BKd passing across the slits S1 and S2. Therefore, the respective centers of the pulses P1 to P4 can be considered as the positions of the centers xga1 and xga2 of the beam BKa passing across the slits S1 and S2 and as the positions of the centers xgd1 and xgd2 of the beam BKd passing across the slits S1 and S2, respectively.

As mentioned above, the center calculating circuit 88 calculates the positions of the centers xga1, xga2, xgd1 and xgd2 of the beams BKa and BKd passing across the slits S1 and S2. The distance between the positions xga1 and xgd1 shown in FIG. 7 corresponds to the distance in the main-scanning direction D0 between the beams BKa and BKd. Also, the distance D0 is three times as long as the pitch of the beams BKa to BKd in the main-scanning direction D1. Therefore, the center calculating circuit 88 calculates the pitch D1 by dividing the distance between the position xga1 and the position xgd1 by three.

Further, the center calculating circuit 88 calculates the pitch D2 from the distance d1 between the position of the center xga1 of the beam BKa passing across the slit S1 and the position of the center xga2 of the beam BKa passing across the slit S2, the distance d2 between the position of the center xgd1 of the beam BKd passing across the slit S1 and the position of the center xgd2 of the beam BKd passing across the slit S2, and the angle θ of the slits S1 and S2 to each other. More specifically, a condition tan θ=(d2−d1)/3D2 is satisfied, wherein d1 is the distance between the position xga1 and the position xga2, and d2 is the distance between the position xgd1 and the position xgd2. That is, D2=(d2−d1)/3 tan θ. Therefore, the center calculating circuit 88 calculates the pitch D2 by using the following expression (2).

$$D2 = \{(xgd2-xgd1) - (xga2-xga1)\}/3 \tan \theta \qquad (2)$$

The storage section 94 is, for example, a memory, a hard disk or the like, and is stored with pitch standard data Dc2 that are standard values of the pitch D2. When the resolution is 1200 dpi, the standard value Dc2 is 21.1 μm. The subtracting circuit 92 subtracts the standard value Dc2 from the value D2 and obtains a difference ΔD2. Then, the subtracting circuit 92 generates a control signal based on the difference ΔD2 and sends the control signal to the amplifying circuit 96.

Now, the control signal is described. The control signal permits the motor driver 98 to control the motor 100. The motor 100 is a stepping motor that rotates clockwise (forward direction) or counterclockwise (reverse direction) when the motor 100 receives a plurality of pulse signals. The control signal is composed of a plurality of pulse signals and is to actuate the motor 100 to rotate the light source 62 such that the difference ΔD2 will be zero. When the difference ΔD2 is negative, it is necessary to rotate the light source 62 shown by FIG. 3a clockwise. In this case, the pulses of the pulse signals arise in such an order (forward order) to rotate the motor 100 clockwise. On the other hand, when the difference ΔD2 is negative, it is necessary to rotate the light source 62 counterclockwise. In this case, the pulses of the pulse signals arise in such an order (reverse order) to rotate the motor 100 counterclockwise.

When the difference ΔD2 is relatively large, it is necessary to rotate the light source 62 largely, and when the difference ΔD2 is relatively small, it is necessary to rotate the light source 62 slightly. Accordingly, the number of pulses in the pulse signals depends on the degree of the difference ΔD2.

The amplifying circuit 96 amplifies the pulse signals serving as the control signal and sends the amplified pulse signals to the motor driver 98. The motor driver 98 drives the motor 100 in accordance with the pulse signals. More specifically, when the pulses of the pulse signals arise in the forward order, the motor driver 98 applies a driving current to the motor 100 such that the light source 62 will rotate clockwise by an angle corresponding to the number of pulses in the signals. On the other hand, when the pulses of the pulse signals arise in the reverse order, the motor driver 98 applies a driving current to the motor 100 such that the light source 62 will rotate counterclockwise by an angle corresponding to the number of pulses in the signals. In this way, the pitch D2 of the beams BKa to BKd is kept to be the standard value Dc2.

The adjustments to the pitches of the beams BKa to BKd have been described above. In the image forming apparatus 1, the pitch adjustments to the beams BY, BM and BC as well as the beam BK can be performed in the same manner although the pitch adjustments to the beams BY, BM and BC are not described here.

Advantages

In the image forming apparatus 1 above, it is possible to detect the positions of the centers of the beams BKa to BKd accurately. In the color image forming apparatus disclosed by Japanese Patent Laid-Open Publication No. 2009-244843, the maximum electric potential outputted from the PD as shown by FIG. 11a is changeable. When the maximum electric potential is relatively low, the electric potential rises gradually, and when the maximum electric potential is relatively high, the electric potential rises steeply. Accordingly, the time when the PD output goes beyond a threshold depends on the maximum electric potential of the PD output. The delay time from the COMP output is fixed regardless of the fluctuation of the PD output, and the rise of the delay output may not be incident with the center (peak) of the PD output.

In the image forming apparatus 1, on the other hand, the sampling circuit 86 converts the detection signal into data values d1 to dn at regular time intervals, and the center calculating circuit 88 calculates the positions of the centers of the beams BKa to BKd from the data values d1 to dn and the time data t1 to tn associated with the data values d1 to dn. Thus, in the image forming apparatus 1, the positions of the centers of the beams BKa to BKd passing across the slits S1 and S2 are calculated not only from the rises of the pulses but also the whole parts of the pulses. Therefore, whether the rises of the pulses occurring in the detection signal caused by the travels of the beams BKa to BKd across the slits S1 and S2 are steep or gradual, it is possible to detect the positions of the centers of the beams BKa to BKd accurately.

In the image forming apparatus 1, the slit S1 extends in the sub-scanning direction, and the slit S2 extends at an angle θ to the slit S1. Thereby, it is possible to calculate the pitch D2 of the beams BKa to BKd from the positions of the center xga1 and xga2 of the beam BKa passing across the slits S1 and S2 and the positions of the center xgd1 and xgd2 of the beam BKd passing across the slits S1 and S2. Thus, in the image forming apparatus 1, the pitch D2 of the beams BKa to BKd can be adjusted.

In the image forming apparatus 1, further, it is possible to calculate the pitch in the main-scanning direction D1 of the beams BKa to BKd from the positions of the center xga1 and xgd1 of the beams BKa and BKd passing across the slit S1.

The distance in the main-scanning direction D0 between the beams BKa and BKd is larger than the maximum distance in the main-scanning direction between the slits S1 and S2. Therefore, after the beam BKa finishes passing across the slits S1 and S2, the beam BKd starts passing the slits S1 and S2. Accordingly, the pulses P1 to P4 arise in the order as shown in FIG. 7. The arising order of the pulses P1 to P4 never changes, and therefore, it is not necessary to recognize what beam passing across which slit S1 or S2 has caused the pulse.

First Modification

Figure 8:
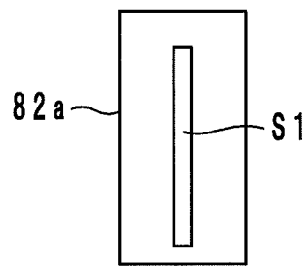
FIG. 8 is a plan view of a first modified cover.

Next, a first modification of the cover 82 is described with reference to the drawings. FIG. 8 shows a first modified cover 82a.

In the first modified cover 82a, only one slit S1 extending in the sub-scanning direction is made. In the image forming apparatus 1 provided with the cover 82a, the pitch in the main-scanning direction D1 of the beams BKa to BKd can be calculated.

Second Modification

Figure 9:
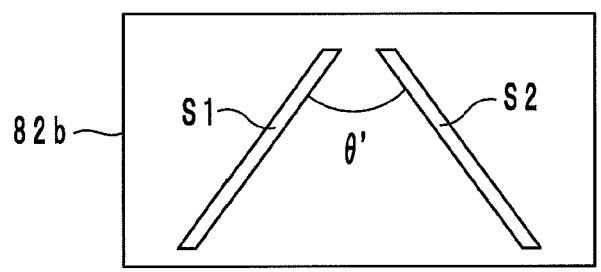
FIG. 9 is a plan view of a second modified cover.

Next, a second modification of the cover 82 is described with reference to the drawings. FIG. 9 shows a second modified cover 82b.

In the second modified cover 82b, slits S1 and S2 are made at an angle θ' so as to be axisymmetric with each other with respect to the sub-scanning direction in such a way that the distance between the slits S1 and S2 becomes wider toward the end. In the image forming apparatus 1 provided with the cover 82b, the pitch in the sub-scanning direction D2 of the beams BKa to BKd can be calculated.

Third Modification

Figure 10:
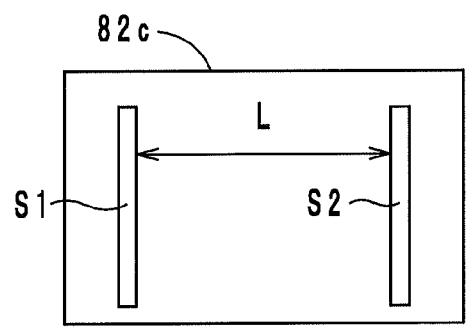
FIG. 10 is a plan view of a third modified cover.

Next, a third modification of the cover 82 is described with reference to the drawings. FIG. 10 shows a third modified cover 82c.

In the third modified cover 82c, slits S1 and S2 both of which extend in the sub-scanning direction are made at a distance L from each other. In the image forming apparatus 1 provided with the cover 82c, the traveling speed v of the beams BKa to BKd in the main-scanning direction can be calculated.

In the embodiment above, the cover 82, 82a, 82b or 82c is a plate-like member made of SUS304. However, the cover may be made of any other metal or glass. When the slits S1 and S2 have widths equal to or greater than 10 μm, not only electric spark machining but also laser machining may be used to form the slits S1 and S2. When the slits S1 and S2 have widths less than 10 μm, the slits S1 and S2 shall be formed by chromium-plating a surface of a glass substrate and by etching the chromium-plated surface.

As the light receiving element 80, a phototransistor, a germanium photodiode, an avalanche photodiode, a photomultiplier or the like may be used.

Although the present invention has been described in connection with the preferred embodiment above, it is to be noted that various changes and modifications are possible to those who are skilled in the art. Such changes and modifications are to be understood as being within the scope of the invention.

What is claimed is:

1. An image forming apparatus comprising:
a light source for emitting a beam;
a deflector for deflecting the beam;
a light receiving element for receiving the beam and generating a detection signal;
a converter for converting electric potentials of the detection signal into data values and generating time data associated with the data values; and
a first calculator for calculating a position of center of the beam as the beam passes across the light receiving element, based on the data values and the time data,
wherein the first calculator calculates the position of center xg of the beam by using the following expression, wherein d1 to dn denote the data values, t1 to tn denote the time data associated with the data values d1 to dn, and v denotes travelling speed of the beam, $$xg = \frac{\sum_{i=1}^{n}(di \cdot xi)}{\sum_{i=1}^{n} di} \cdot v.$$

2. An image forming apparatus according to claim 1, wherein the light source emits a plurality of beams that are aligned in a direction not parallel to a main-scanning direction.

3. An image forming apparatus according to claim 2, further comprising a cover for covering a light receiving surface of the light receiving element, the cover having a first slit extending in a direction perpendicular to the main-scanning direction.

4. An image forming apparatus according to claim 3, wherein the first slit has a width smaller than diameters of spots of the beams on the cover.

5. An image forming apparatus according to claim 3, wherein the cover further having a second slit extending in a direction not parallel to the first slit.

6. An image forming apparatus according to claim 5, wherein a distance in the main-scanning direction between two beams respectively located at opposite ends of the cover is larger than a maximum distance in the main-scanning direction between the first slit and the second slit.

7. An image forming apparatus according to claim 5, wherein:
the plurality of beams include a first beam and a second beam;
the image forming apparatus further comprises a second calculator for calculating a distance in the sub-scanning direction between the first beam and the second beam from a distance between a position of center of the first beam passing across the first slit and a position of center of the first beam passing across the second slit, a distance between a position of center of the second beam passing across the first slit and a position of center of the second beam passing across the second slit, and an angle of the first slit and the second slit to each other.

8. An image forming apparatus according to claim 5, wherein the second slit has a width smaller than diameters of spots of the beams on the cover.

9. An image forming apparatus according to claim 3, wherein the cover further has a second slit extending parallel to the first slit.

10. An image forming apparatus according to claim 1, further comprising a pitch calculating unit that calculates a pitch of the beam based on the calculated position of the center of the beam.

11. An image forming apparatus according to claim 1, further comprising a motor for rotating the light source, wherein the detection signal generated by the light receiving element is a pulse signal having a number of pulses corresponding to a number of calculated positions of the center of the beam as the beam passes across the light receiving element, and the motor rotates the light source by an angle corresponding to the number of pulses.

12. An image forming apparatus comprising:
a light source for emitting a plurality of beams that are aligned at uniform intervals in a direction not parallel to a main-scanning direction;
a deflector for deflecting the beams;
a light receiving element for receiving the beams and generating a detection signal;
a cover for covering a light receiving surface of the light receiving element, the cover having a first slit and a second slit, the first slit having a width smaller than diameters of spots of the beams on the cover and extending in a direction perpendicular to the main-scanning direction, and the second slit having a width smaller than diameters of spots of the beams on the cover and extending in a direction not parallel to the first slit;
a converter for converting electric potentials of the detection signal into data values and generating time data associated with the data values; and
a first calculator for calculating positions of centers of the beams, based on the data values and the time data;
wherein:
the plurality of beams include a first beam and a second beam;
a distance in the main-scanning direction between the first beam and the second beam is greater than a maximum distance in the main-scanning direction between the first slit and the second slit such that the second beam passes across the first slit and the second slit after the first beam passes across the first slit and the second slit; and
the image forming apparatus further comprises:
a second calculator for calculating a distance in the sub-scanning direction between the first beam and the second beam from a distance between a position of center of the first beam passing across the first slit and a position of center of the first beam passing across the second slit, a distance between a position of center of the second beam passing across the first slit and a position of center of the second beam passing across the second slit, and an angle of the first slit and the second slit to each other; and the second calculator for further calculating a distance in the main-scanning direction between the first beam and the second beam from a distance between a position of center of the first beam passing across the first slit and a position of center of the first beam passing across the second slit, and a distance between a position of center of the second beam passing across the first slit and a position of center of the second beam passing across the second slit, wherein the first calculator calculates the positions of centers xg of the beams by using the following expression, wherein d1 to dn denote the data values, t1 to denote the time data associated with the data values d1 to dn, and v denotes travelling speed of the beams, $$xg = \frac{\sum_{i=1}^{n}(di \cdot xi)}{\sum_{i=1}^{n} di} \cdot v.$$

13. An image forming apparatus according to claim 12, wherein the first beam and the second beam are respectively located at opposite ends of the aligned beams.

* * * * *